United States Patent [19]

Moultrie

[11] 3,947,095
[45] Mar. 30, 1976

[54] REAR VIEW VISION DEVICE
[75] Inventor: Charles W. Moultrie, Dolton, Ill.
[73] Assignee: Marie Saratore, Calumet City, Ill. ; a part interest
[22] Filed: Mar. 18, 1974
[21] Appl. No.: 452,061

[52] U.S. Cl. .................. 350/302; 350/52; 350/211
[51] Int. Cl.² ........................................ G02B 5/08
[58] Field of Search ............ 350/52, 211, 301, 302, 350/307

[56] References Cited
UNITED STATES PATENTS

| | | | |
|---|---|---|---|
| 1,097,635 | 5/1914 | Humbrecht ...................... | 350/52 X |
| 1,445,284 | 2/1923 | Bell et al .......................... | 350/52 X |
| 2,757,575 | 8/1956 | Kovach ........................... | 350/302 X |
| 3,043,195 | 7/1962 | Moultrie ......................... | 350/302 X |
| 3,809,462 | 5/1974 | Baumgardner et al. ........ | 350/211 X |

FOREIGN PATENTS OR APPLICATIONS

| | | | |
|---|---|---|---|
| 303,905 | 5/1922 | Germany .............................. | 350/52 |

Primary Examiner—John K. Corbin
Assistant Examiner—F. L. Evans
Attorney, Agent, or Firm—Hill, Gross, Simpson, Van Santen, Steadman, Chiara & Simpson

[57] ABSTRACT

Compact periscopic device particularly adapted for vehicular rear vision, including an optical train to provide a wide field of view with optimum resolution and brightness and adapted to the confines of a relatively small housing enclosure. The optical train directs the incoming light rays through a series of direction reversals whereby the housing size requirements are considerably reduced. Further, the optical train consists of a pair of alternately operable, Fresnel-type objective lenses of differing focal length to provide for either a wide unit magnification of rear-viewed objects in one instance or a greatly expanded field of view in another instance. The optical train also includes image-reversing and image-inversion reflective surfaces, to correct for lens reversal and inversion of the image.

12 Claims, 8 Drawing Figures

U.S. Patent March 30, 1976 Sheet 1 of 3 3,947,095
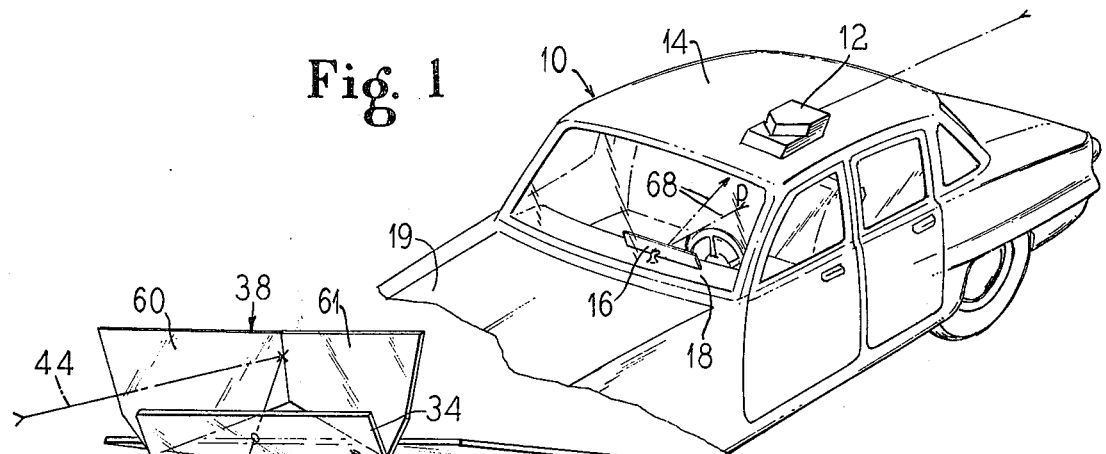
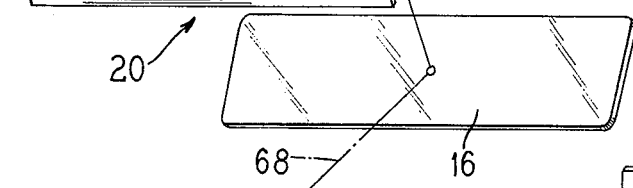
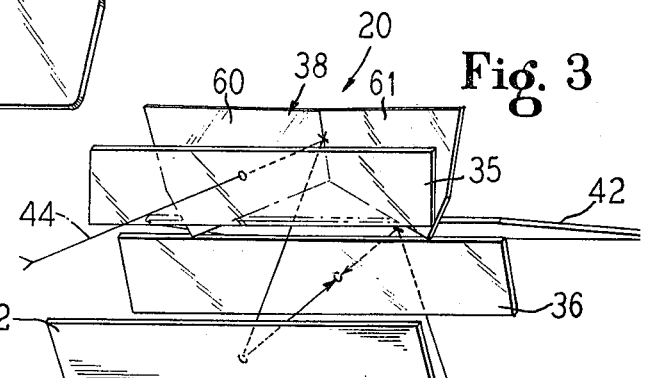
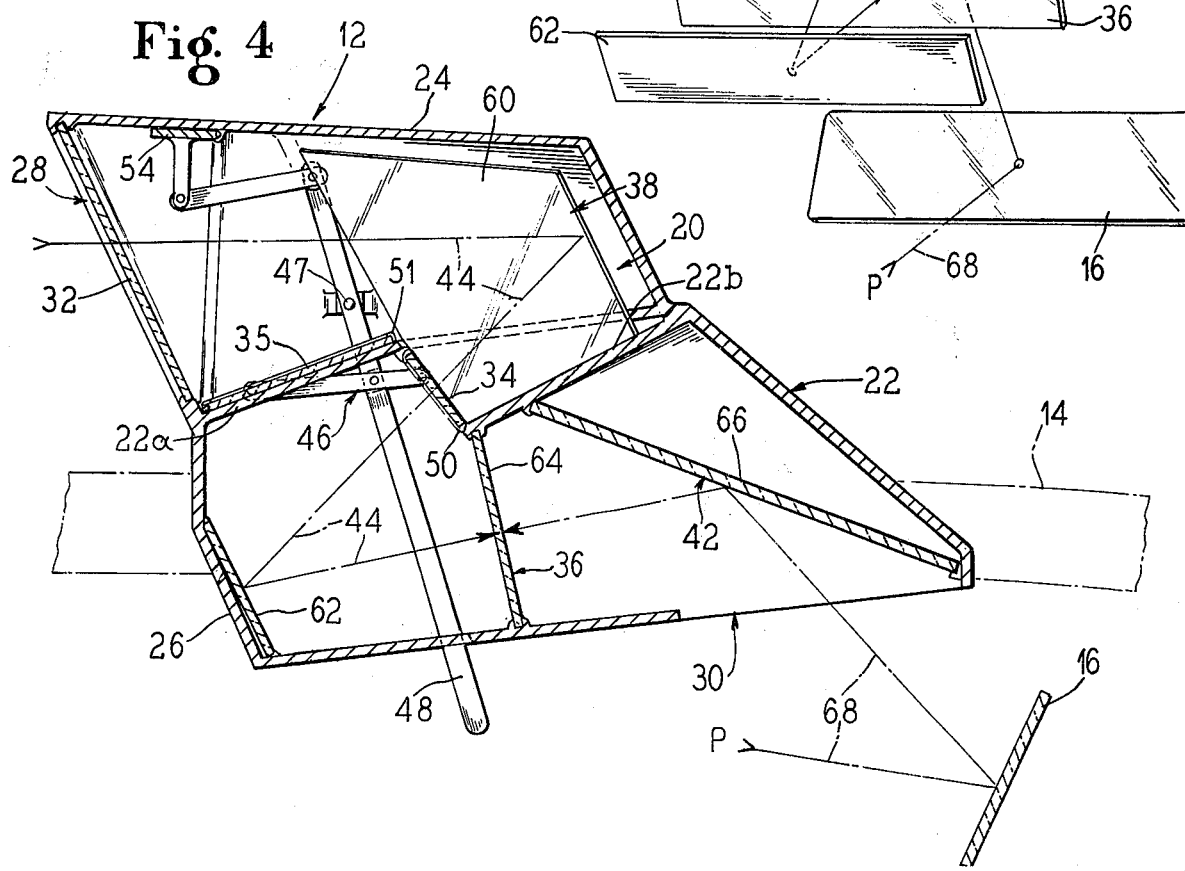

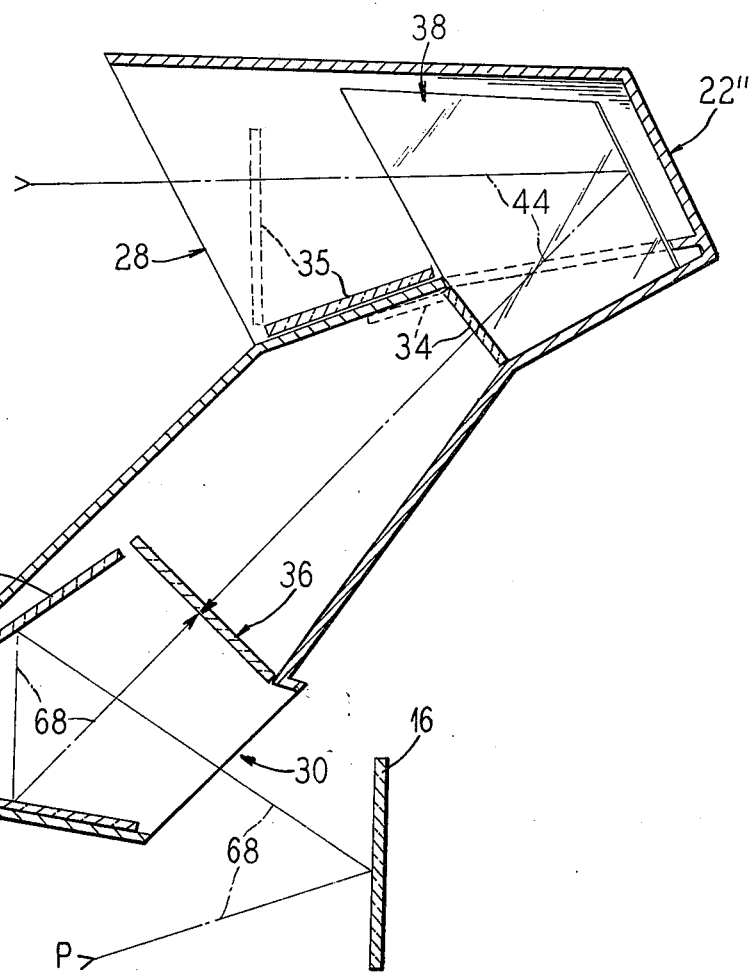
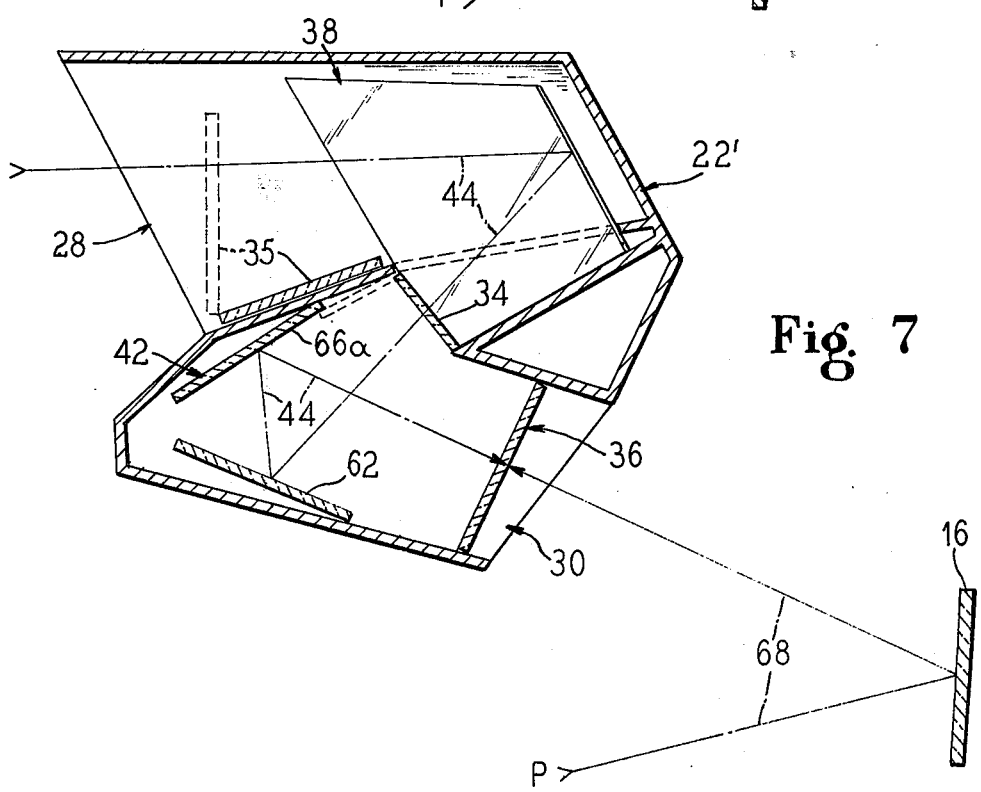
Fig. 8
Fig. 7

REAR VIEW VISION DEVICE

BACKGROUND OF THE INVENTION

1. Field of the Invention

This invention relates to a rear view periscopic device and an optical train therefor.

2. Prior Art

Heretofore, numerous efforts have been made to provide a rear viewing optical device for vehicular use which enables the user to see a true perspective view of objects behind an observer. Many of the earlier devices employed a rearward directed objective lens mounted in the upper portion of a tube member extending well above a vehicle roof and arranged to direct an image downward for viewing by the vehicle driver on a display surface. The primary problem with these designs has been their small visual fields and their bulky size. In constructing these periscopic devices, the required spacing between the objective lens and the image receiving surface plus the placement of image directing and image corrective mirrors produced an unacceptable proportioned device, even though many advantages made their use highly desirable. Most of these past designs required that a considerable portion of the device extended well above the vehicle roof line in which it was used to the detriment of the vehicle's appearance and which created an obstacle subject to damage. Further, a considerable portion of the device extended downward into the vehicle producing a safety hazard as well as obscuring the forward view.

More recently, certain periscopic devices have been devised to provide an extremely wide field of view for an over-the-top system of rear viewing which utilizes a pair of very wide mirrors mounted in the roof of a vehicle to bring an image to the driver's viewing mirror. Herein, the advantage of providing a wide angle rear view display system is overshadowed by the numerous objectional features, primarily due to the device's size. Namely, headroom obstruction; necessity for a wide roof opening, resulting in a weakened roof; high cost; subject to vibration; high wind resistance; defrosting and cleaning difficulties; limitations in viewing mirror location; and aesthetic considerations.

SUMMARY OF THE INVENTION

Applicant's invention has overcome the difficulties and shortcomings of the prior art and has made the over-the-top system of wide angled rear viewing practical for the first time by providing a compact apparatus requiring negligible space inside the operating compartment of a vehicle and having an aesthetically acceptable low profile portion mounted above the vehicle roof. Further, a choice of viewing areas to be covered is provided in the present device with a simple flick of a lever. Accordingly, the driver of the vehicle may select unit magnification rear viewing to accurately judge distances of vehicles behind or an expanded wide viewing coverage, desirable when "changing lanes" or when traveling on wide thoroughfares.

This compact design is made possible by virtue of an optical train which includes a pair of light reflective surfaces positioned in the device to direct the path of image forming light rays through a series of direction reversals between sighting and viewing openings in the device's housing. The light rays, as directed along the image path, pass through a thin rectangular objective lens, selectively positioned in an operable orientation from a pair of objective lenses provided in the housing to focus the light rays on an image forming screen. Each lens of the pair of lenses being spaced from the screen, as measured along the image path, a distance equivalent to the focal length of the respective lens.

Reflective surfaces are also provided to correct for lens related image inversion and reversal and to make the image visible on a viewing mirror positionable in a most advantageous location for a close-in display. Further, applicant has employed thin Fresnel-type lenses, having excellent resolution and well-suited to the compact design. In addition, a Fresnel-type screen is utilized to provide a bright and evenly illuminated image on the screen.

A principal advantage of the present invention, therefore, is a vehicular rear viewing device which provides an unobstructed wide field of rear vision, on a single display surface for maximum safety to the vehicle's operator.

Another advantage of this invention is a novel and inexpensive periscopic device which will provide a suitable field of view, consistent with the driving environment encountered.

Yet another advantage of this invention is a compact periscopic device which can easily be maintained and which is aesthetically acceptable to the general public.

Other advantages, features and objects of the invention will be readily apparent from the following description and with reference to the accompanying drawings, although variations and modifications may be effected without departing from the spirit and scope of the novel concepts of the disclosure.

DESCRIPTION OF THE DRAWINGS

FIG. 1 is a perspective view of a preferred embodiment of my periscopic device, mounted in the roof of an automobile;

FIG. 2 is a perspective view of the optical train employed in the device shown in FIG. 1 with the housing removed and the wide angle objective lens shown in its operable position;

FIG. 3 is a view similar to FIG. 2, but showing the optical train with the standard objective lens in its operable position;

FIG. 4 is a sectional view of the periscopic device shown in FIG. 1 and utilizing the optical train in the manner shown in FIG. 2;

FIG. 7 is a diagrammatic sectional view of an alternate form of my invention in which the design achieves a maximum degree of compaction; and FIG. 8 is a diagrammatic sectional view of yet another embodiment of my invention having a somewhat less compact design than my preferred embodiment.

DESCRIPTION OF PREFERRED EMBODIMENTS OF INVENTION

Figure 5:
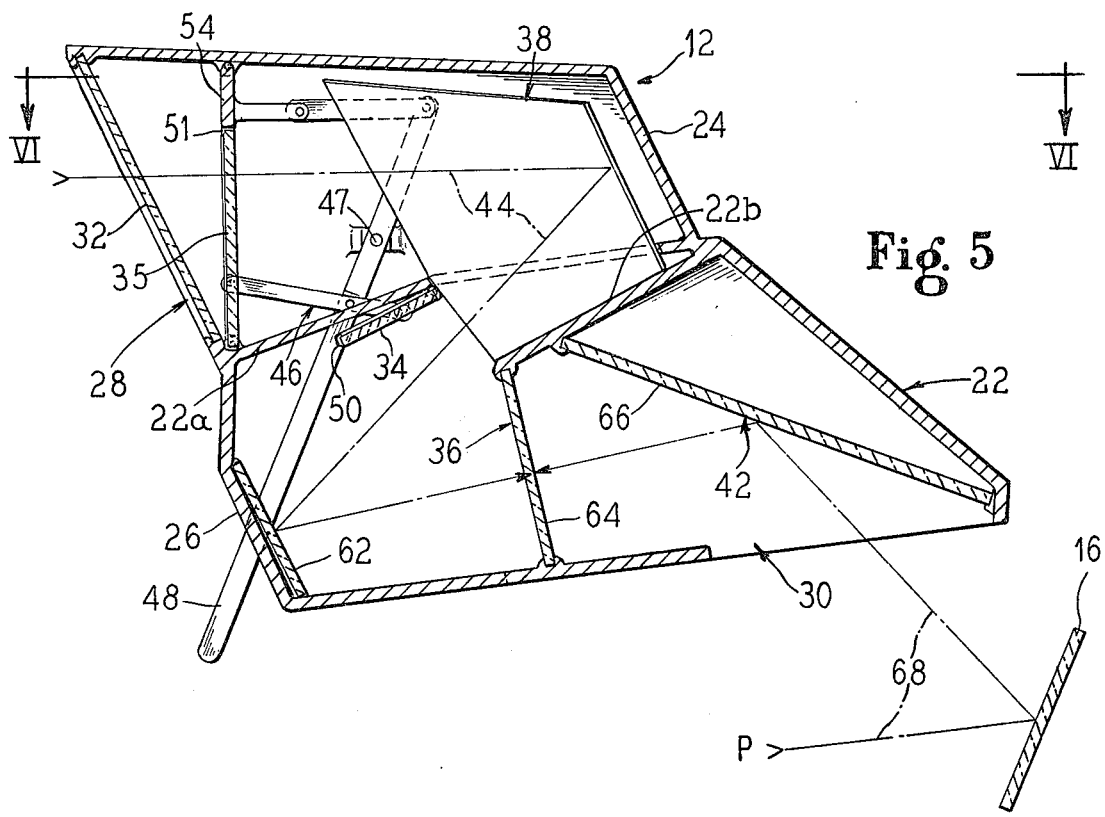
FIG. 5 is a view similar to FIG. 4, but utilizing the optical train in the manner shown in FIG. 3.
Figure 6:
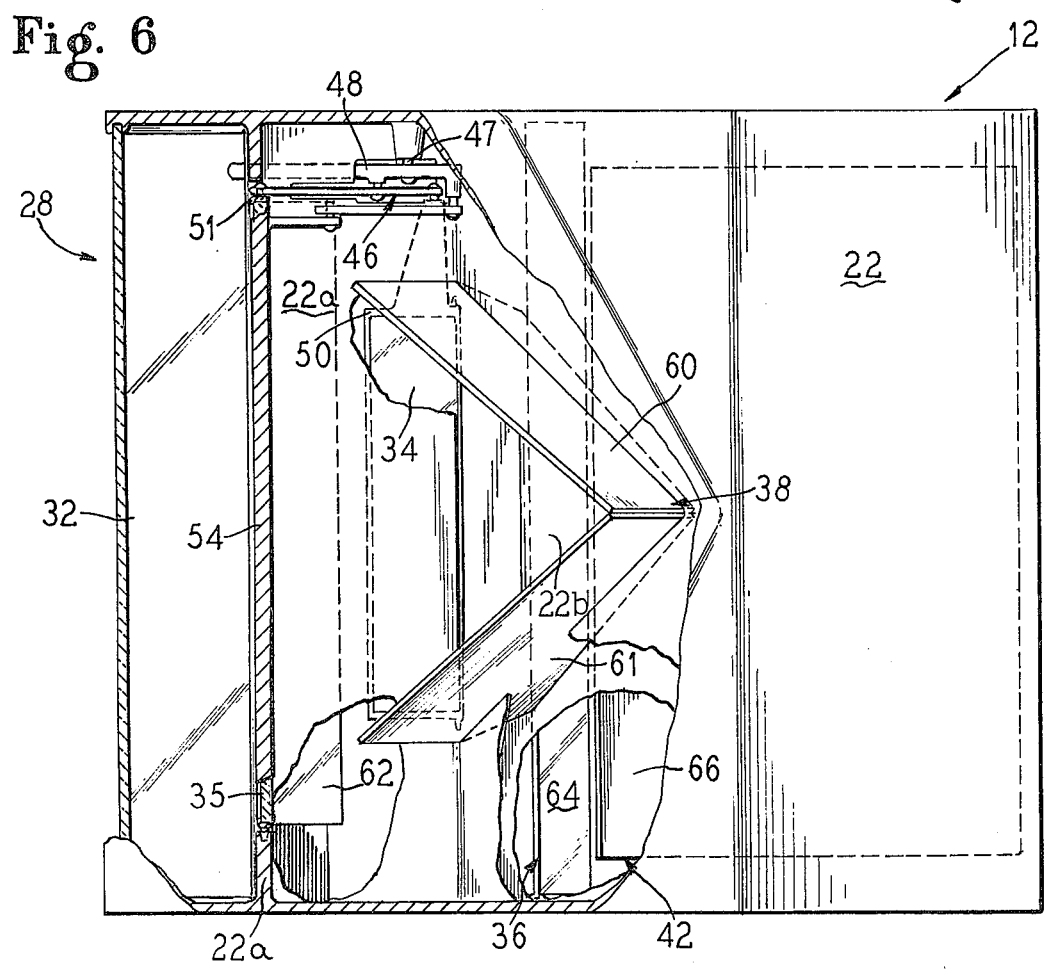
FIG. 6 is a sectional view taken substantially along the line VI—VI of FIG. 5 with certain portions broken away to better illustrate the relative positions of the internal components.

Referring now more particularly to the embodiment of my invention shown in FIGS. 1 to 6 of the drawings, an automobile 10 is provided with a periscopic device 12 mounted in the automobile roof 14 and adapted to display a panoramic view of objects to the rear on an adjustable viewing mirror 16. Preferably, the viewing mirror 16 is located on the automobile dashboard 18, close to the driver's line of sight and just below the front edge of the automobile hood 19 as viewed from the driver's position. Herein, minimum eye or head movements are required of the driver to scan his environment and blind spots are effectively eliminated from the rear scene and the rear vision information is displayed where it will not obscure the forward scene.

The periscopic device 12 includes an optical train 20 enclosed in a weather-tight housing 22 which is suitably secured in the roof 14 of the automobile 10, with an upper portion 24 extending above the roof 14 on the outside and a lower portion 26 extending slightly downward inside the automobile 10. The upper portion 24 of the housing is provided with a rearwardly directed, image-receiving opening 28 while the lower portion 26 is provided with a downwardly directed, image-viewing opening 30. A transparent seal 32 is provided to cover the opening 28 to protect the optical train 20 from the elements on the outside of the automobile 10. Similarly, a transparent seal may be provided to seal the opening 30 to protect the optical train 20 from smoke and air-borne dust on the inside.

Now, with specific reference to FIGS. 2 and 3, the optical train 20 includes a pair of objective lenses 34 and 35; a screen 36 for focusing an image thereon; an image-reversing means 38 and an image-inversion means 42. Preferably the lens 34 is a thin Fresnel-type plastic lens proportioned substantially wider than its height and having a comparatively short focal length. The lens 34 is pivotally mounted in the housing 22 for selective positioning either in an operable location shown in FIGS. 2 and 4 or an out-of-the-way position relative to the image path 44, as best seen in FIG. 5. Further, the lens 34 is spaced from the screen 36, as measured along the image path 44, a distance consistent with its focal length to focus a sharp image on the screen 36.

Similarly, the lens 35 is preferably a thin Fresnel-type plastic lens pivotally mounted in the housing 22 for selective positioning in an operable position, as shown in FIGS. 3 and 5, or an out-of-the-way position, seen in FIG. 4. The lens 35 is larger in size than the lens 34 and has a substantially longer focal length. Accordingly, the lens 35 is spaced a greater distance from the screen 36 to project a sharp image thereon. The focal lengths of the lenses 35 and 34 are selected to provide a wide field of view at unit magnification or a greatly expanded wide angle field of view at a somewhat reduced image size.

The lenses 34 and 35 are interconnected by a control linkage 46 which is pivotally supported in the housing 22 on a pin 47 and having a lever arm 48 extending from the housing for manual operation to selectively position one of said lenses in an operable position and concurrently to move the other of said lenses into an out-of-the-way position.

Both lenses 34 and 35 are preferably mounted in frames 50, 51 respectively, to rigidify the lenses and to provide a suitable supporting structure to accommodate pivotal mounting in the housing 22. The control linkage 46, while shown as being hand-operated, may alternately be controlled by an electromagnetic means or other suitable servo-means, if desired.

A light shield 54 is shown cooperating with the lens 35 and is operatively connected to the linkage 46 for movement to a light-blocking position above the lens 35 (when brought into an operable position) to restrict stray incident light rays which would otherwise by-pass the lens 35 and interfere with image contrast. Certain housing partitions, such as 22a and 22b are also effective to retard light scattering, whereby only the light rays producing an image on the screen 36 are unobstructed. Further, the interior surfaces of the housing 22 are preferably finished in a dull black to absorb diffused light rays. In other proportioned designs, the lens 35 may be sufficiently larger and with suitable clearances, wherein the light shield 54 may be dispensed with.

Utilizing Fresnel-type lenses for the objective lenses 34 and 35 provides a thin light-weight construction consistent with the compact design of the present invention. Conventional glass lenses of equivalent size and focal length would not only be extremely expensive, but would also necessitate a much larger housing 22 and would require a more bulky linkage and supporting components to pivotally move thick, cumbersome glass objective lenses. The compact design of the periscopic device 12 also simplifies adapting defrosting-defogging systems (not shown) to the device.

The reverser means 38 is arranged to correct for image reversal, associated with the use of a single objective lens. The reverser means 38 comprises a pair of mirrors 60, 61 disposed at a 90° angle relative to one another and fixedly mounted in said housing 22 at a comparative shallow angular tilt, to direct the incoming light rays in an opposite direction and somewhat downward along the image path 44 and onto the surface of a mirror 62 mounted in the housing 22 below the lens 35. The reverser means 38 is effective to transpose the right and left hand portions of the image forming light rays in a similar manner to the converter device described in my U.S. Pat. No. 3,165,573, issued Jan. 12, 1965. The reverser means 38 is positioned between the wide angle lens 34 and the unit magnification standard lens 35 relative to the image path 44, at an equal angle relative to said lenses in their respective operable positions, which may be in the order of 15° to 30°, with an angle of 22° shown in the preferred embodiment.

Accordingly, the reversing means 38 is positioned at a comparatively shallow angle relative to the image path 44, whereby a substantially greater effective reflective surface is made available as opposed to comparable size mirrors disposed at considerably greater angles as provided in the prior art. This feature further enhances the compactness of my invention while providing the desired full width field of view which may be as much as 70° or even more.

The images of rear-viewed objects are focused on a frosted surface 64 of the screen 36. The screen 36, preferably comprises a Fresnel-type screen to provide a uniformly bright illuminated image.

The image, as focused on the forwardly disposed frosted surface 64 of the screen 36, while being reversed by the reversing means 38, is as yet inverted. Accordingly, the inversion means 42, comprising a mirror 66, is positioned in the housing 22 above the viewing opening 30 to invert the image by providing a line of sight 68 from the driver's vantage point "P" to the viewing mirror 16, upward through the opening 30 and to the image forming frosted surface 64 of the screen 36. Herein, the image inversion correction is accomplished to right the image as viewed by the driver and provide a bright true perspective wide-field display of objects behind the driver.

In some instances, it may be desirable to provide a viewing mirror 16 which has a curved surface to somewhat alter the image size as it is focused on the screen 36, however; normally, a flat surface mirror is preferred to avoid linear distortions.

Referring now more particularly to the embodiment of my invention shown in FIG. 7, which provides a maximum degree of compactness, a housing 22' has been modified to locate the mirror 6a of the inversion means 42 on the opposite side of the screen 36 from that of the embodiment shown in FIGS. 1 to 6. Herein the viewing mirror 16 directly monitors the corrected image displayed on the screen 36.

FIG. 8 provides still another form of my invention, being somewhat less compact than the other embodiments, in which the housing 22" has been modified to locate both mirrors 66a and 62 along the line of sight 68 to the screen 36. In the embodiments shown in FIGS. 7 and 8, the viewing mirror 16 is somewhat limited in its mounting locations and accordingly may not be suitable for use on some vehicles.

I claim as my invention:

1. A compact periscopic device for vehicular rear vision comprising:
   a housing mounted in a vehicle roof with an image receiving opening therein directed rearwardly and extending above the roof, and having an image viewing opening therein directed generally downward inside the vehicle;
   a transparent seal extending over said image receiving opening;
   an angularly movable objective lens having a selected focal length angularly movable into and out of the path of light through said image receiving opening;
   a screen adapted to accommodate an image to be focused thereon by said lens and positioned in said housing for viewing through said image viewing opening;
   a second objective lens having a different focal length than the focal length of said first lens and angularly movable into and out of the path of light alternately of said first lens and adapted to focus an image on said screen as said first lens is out of position to focus an image on said screen;
   a plurality of image reflecting surfaces positioned in said housing and adapted to direct the image along a path through a series of direction changing reversals between said image receiving opening and said image viewing opening and including means to correct for optical reversal and means to correct for optical inversion of the image, comprising a pair of image reversing mirrors disposed in angular relation with respect to each other and generally facing each other and converging to an apex in the image path of said transparent seal, and a mirror spaced beneath and downstream of the image path reflected by said mirrors to correct for optical inversion, said screen being in the path of said image through said image reversing mirrors, and said image inversion mirror, said image inversion mirror being downstream of said screen and directing the image through said image viewing opening;
   one of said objective lenses being upstream of said image reversing mirrors and the other of said objective lenses being downstream of said image reversing mirrors and means selectively moving said lenses into and out of the path of light through said image receiving opening alternately of each other.

2. The periscopic device of claim 1, wherein said first objective lens has a focal length adapted to focus a generally full-size image on said screen and said second objective lens has a focal length adapted to focus an expanded wide field image on said screen, and link and lever means pivotally connected with said lenses for alternately and selectively moving one lens into position to focus an image on said screen and moving the lens not in position to focus an image on the screen out of the path of light through the image receiving opening.

3. The periscopic device of claim 1, wherein said first mentioned objective lens comprises a horizontally elongated unit magnification standard lens and said second mentioned objective lens comprises a horizontally elongated wide angle reduced image size lens, wherein said lenses are transversely pivoted to said housing and a single lever is effective to move one of said lenses into the path of light through the image receiving opening and the other of said lenses out of the path of light through the image receiving opening.

4. The periscopic device of claim 3, wherein the pair of mirrors in angular relation with respect to each other and converging to an apex to correct for optical reversal, is positioned between said pair of lenses and disposed at equal angles relative to each of said lenses in their respective image focusing positions.

5. The periscopic device of claim 4, wherein said equal angles relative to each of said lenses is in the order of 15° to 30°.

6. The periscopic device of claim 4, wherein said pair of lenses are Fresnel-type lenses and are operably interconnected by a control linkage to accommodate alternate and selective positioning of one of said pair of lenses in a focusing position, while the other of said pair of lenses is positioned in an out-of-the-way, inoperative position.

7. The periscopic device of claim 6, wherein the screen comprises a Fresnel-type image forming screen.

8. The periscopic device of claim 7, including a light shield framing an edge of said unit magnification standard lens when in an operable image focusing position, and wherein said control linkage is operable to position said light shield coincidental with positioning said unit magnification standard lens in an operable image focusing position.

9. A compact periscopic device for vehicular rear vision requiring a minimum amount of vertical space comprising:
   a housing mounted in a vehicle roof with an image receiving opening therein, rearwardly directed and extending above the roof, and having an image viewing opening therein directed downwardly inside the vehicle;
   a screen between said openings having a focusing surface thereon;
   a pair of objective lenses within said housing, including a first lens of one focal length supported in said housing for selective angular movement about a fixed axis between an operable and non-operable position, and a second objective lens of a different focal length than said first lens also supported in said housing for selective angular movement about a fixed axis spaced from the axis of angular movement of said first objective lens and movable between an operable and non-operable position alternately of the position of said first lens, whereby either lens may optionally be brought into position to focus an image on said screen;

spaced partitions between said openings to retard light scattering;

a plurality of image reflecting surfaces supported in said housing on opposite sides of said partitions and adapted to direct the image along a path between said image receiving opening and said image viewing opening and through one of said lenses when positioned downstream of said image reflecting surfaces, and including a pair of facing right-angled mirrors converging to an apex at the image path to correct for optical reversal and a second mirror in the image path to correct for optical inversion of the image;

said lenses being movable about spaced transverse axes and extending along at least one of said partitions when in a non-operable position, on opposite sides of said at least one partition.

10. The compact periscopic device of claim 9, wherein said pair of lenses comprise comparatively thin horizontally elongated Fresnel-type lenses including a unit magnification standard lens and a spaced wide angle reduced image size lens.

11. The periscopic device of claim 10 including a control linkage operably interconnecting said pair of objective lenses and a single lever for operating said control linkage to alternately and selectively position one of said pair of objective lenses in a focusing position and to position the other of said pair of lenses in an out-of-the-way, inoperative position along the at least one of said partitions.

12. The compact periscopic device of claim 11, wherein the first and second objective lenses are elongated Fresnel lenses and the screen is downstream of both lenses and comprises a horizontally elongated Fresnel-type image forming screen.

* * * * *